US012786169B2

(12) United States Patent
Pabijanskas et al.

(10) Patent No.: US 12,786,169 B2
(45) **Date of Patent: *Nov. 3, 2026**

(54) PROTECTED CONFIGURATION OF A VIRTUAL PRIVATE NETWORK SERVER

(71) Applicant: UAB 360 IT, Vilnius (LT)

(72) Inventors: Karolis Pabijanskas, Vilnius (LT); Petras Liumparas, Vilnius (LT)

(73) Assignee: UAB 360 IT, Vilnius (LT)

( * ) Notice: Subject to any disclaimer, the term of this patent is extended or adjusted under 35 U.S.C. 154(b) by 47 days.

This patent is subject to a terminal disclaimer.

(21) Appl. No.: 18/813,241

(22) Filed: Aug. 23, 2024

(65) Prior Publication Data

US 2024/0414131 A1 Dec. 12, 2024

Related U.S. Application Data

(63) Continuation of application No. 18/229,281, filed on Aug. 2, 2023, now Pat. No. 12,101,299, which is a continuation of application No. 17/710,959, filed on Mar. 31, 2022, now Pat. No. 11,757,843, which is a continuation of application No. 17/707,793, filed on Mar. 29, 2022, now Pat. No. 11,463,412.

(51) Int. Cl.

*G06F 21/00* (2013.01)
*H04L 9/40* (2022.01)
*H04L 12/46* (2006.01)

(52) U.S. Cl.

CPC ...... *H04L 63/0272* (2013.01); *H04L 12/4641* (2013.01); *H04L 63/0876* (2013.01)

(58) Field of Classification Search

CPC . G06F 21/6245; G06F 21/6254; G16H 10/60; G16H 10/20; G16H 40/67; H04L 63/029; H04L 63/0407; H04L 67/12

See application file for complete search history.

(56) References Cited

U.S. PATENT DOCUMENTS

| | | | | |
|---|---|---|---|---|
| 6,701,437 | B1 * | 3/2004 | Hoke | H04L 63/0272 709/245 |
| 7,428,754 | B2 * | 9/2008 | Neumann | G06F 21/32 380/280 |
| 9,148,408 | B1 * | 9/2015 | Glazemakers | H04L 63/20 |
| 9,304,941 | B2 * | 4/2016 | Kamath | G06F 12/1408 |
| 9,608,962 | B1 * | 3/2017 | Chang | H04L 63/0428 |
| 10,389,684 | B2 | 8/2019 | Polcha et al. | |
| 11,297,039 | B1 * | 4/2022 | Celiesius | H04L 63/0272 |

(Continued)

*Primary Examiner* — Kendall Dolly

(74) *Attorney, Agent, or Firm* — The Pattani Law Group

(57) ABSTRACT

A method including transmitting, by virtual private network (VPN) server to an infrastructure device while executing a primary VPN operating system, a request for a custom parameter file to enable the VPN server to provide VPN services; authenticating, by the infrastructure device, the VPN server as an authorized recipient of the custom parameter file; transmitting, by the infrastructure device to the VPN server, the custom parameter file based at least in part on authenticating the VPN server as the authorized recipient of the custom parameter file; and configuring, by the VPN server, the primary VPN operating system to utilize the custom parameter file to enable the VPN server to provide the VPN services is disclosed. Various other aspects are contemplated.

20 Claims, 7 Drawing Sheets

(56) References Cited

U.S. PATENT DOCUMENTS

| | | | | |
|---|---|---|---|---|
| 2005/0102504 | A1* | 5/2005 | Le | H04L 69/16 713/160 |
| 2014/0040435 | A1* | 2/2014 | Ylimartimo | H04L 12/2818 709/219 |
| 2014/0041022 | A1* | 2/2014 | Small | H04W 12/126 714/2 |
| 2016/0099917 | A1* | 4/2016 | Glazemakers | H04L 63/0272 726/12 |
| 2016/0134594 | A1* | 5/2016 | Teo | H04L 63/045 713/171 |
| 2016/0269403 | A1* | 9/2016 | Koutenaei | H04L 63/102 |
| 2017/0171156 | A1* | 6/2017 | Schultz | H04L 63/0414 |
| 2018/0359244 | A1* | 12/2018 | Cockerill | H04L 63/105 |
| 2019/0043054 | A1* | 2/2019 | Crank | G06Q 20/4016 |
| 2020/0287910 | A1* | 9/2020 | Zerrad | H04L 63/102 |
| 2022/0159045 | A1* | 5/2022 | Nakano | H04L 65/1046 |
| 2023/0291712 | A1 | 9/2023 | Warmenhoven | |

* cited by examiner

PROTECTED CONFIGURATION OF A VIRTUAL PRIVATE NETWORK SERVER

CROSS REFERENCE

This application is a continuation of U.S. Non-Provisional patent application Ser. No. 18/229,281 filed on Aug. 2, 2023, and titled "Protected Configuration Of A Virtual Private Network Server," which is a continuation of U.S. Non-Provisional patent application Ser. No. 17/710,959 filed on Mar. 31, 2022, and titled "Protected Configuration Of A Virtual Private Network Server," which is a continuation of U.S. Non-Provisional patent application Ser. No. 17/707,793, filed on Mar. 29, 2022, and titled "Protected Configuration Of A Virtual Private Network Server," the entire contents of all of which applications are incorporated herein by reference.

FIELD OF DISCLOSURE

Aspects of the present disclosure generally relate to a virtual private network (VPN), and more particularly to enabling protected configuration of a VPN server.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing, with the help of an encryption algorithm, the data from being in a transparently readable format to being in an encoded, unreadable format. Decryption may be associated with changing, with the help of a decryption algorithm, the data from being in the encoded, unreadable format to being in the transparently readable format. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available (e.g., through a directory), while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string of bits, and the longer the length of the encryption key, the stronger the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports.

When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method including accessing, by a device associated with a virtual private network (VPN) server, an initial operating system stored on a read-only device, the initial operating system being associated with the VPN server providing VPN services; receiving, by the device from the read-only device, a request for authentication information to authenticate the device as an authorized recipient of the initial operating system; transmitting, by the device to the read-only device, the authentication information; and receiving, by the device from the read-only device, the initial operating system based at least in part on transmitting the authentication information.

In another aspect, the present disclosure contemplates a VPN server comprising a volatile memory and a processor communicatively coupled to the volatile memory, the volatile memory and the processor being configured to: access an initial operating system stored on a read-only device, the initial operating system being associated with the VPN server providing VPN services; receive, from the read-only device, a request for authentication information to authenticate the device as an authorized recipient of the initial operating system; transmit, to the read-only device, the authentication information; and receive, from the read-only device, the initial operating system based at least in part on transmitting the authentication information.

In another aspect, the present disclosure contemplates a non-transitory computer readable medium storing instructions, which when executed by a processor associated with a VPN server, configure the processor to: access an initial operating system stored on a read-only device, the initial operating system being associated with the VPN server providing VPN services; receive, from the read-only device, a request for authentication information to authenticate the device as an authorized recipient of the initial operating system; transmit, to the read-only device, the authentication information; and receive, from the read-only device, the initial operating system based at least in part on transmitting the authentication information.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
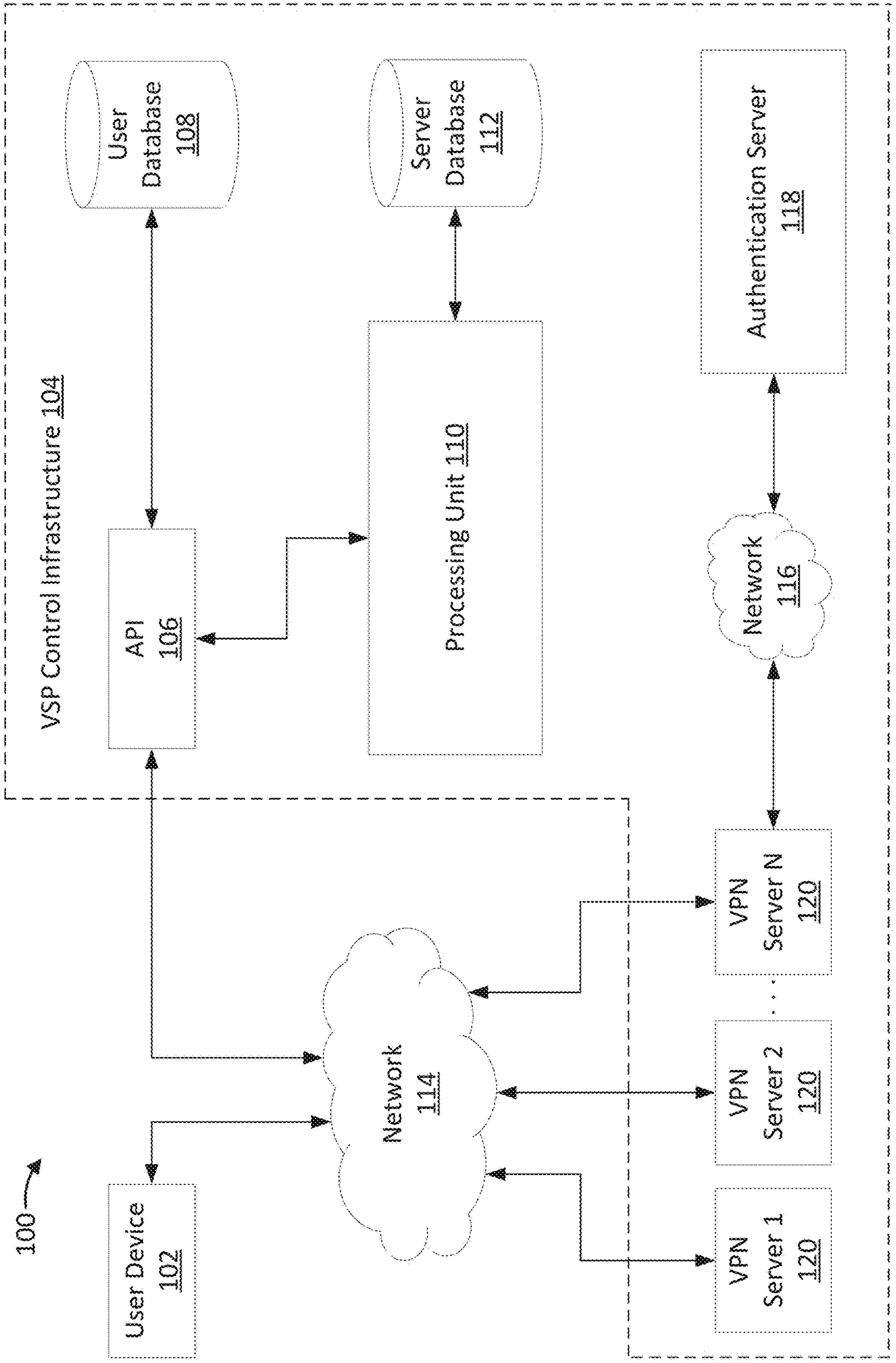

FIG. 1 is an illustration of an example associated with protected configuration of a VPN server, according to various aspects of the present disclosure.

Figure 2:
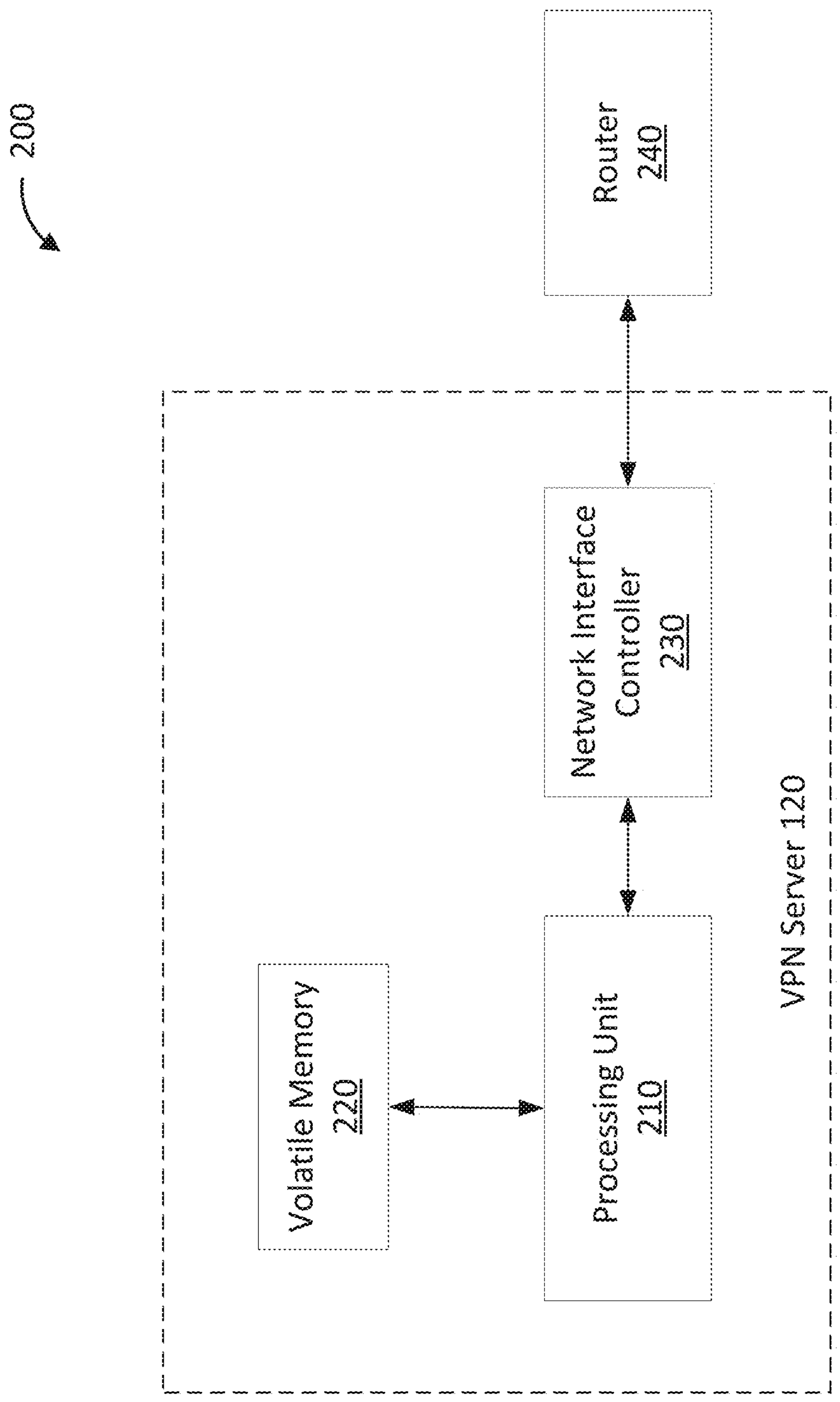

FIG. 2 is an illustration of an example associated with protected configuration of a VPN server, according to various aspects of the present disclosure.

Figure 3:
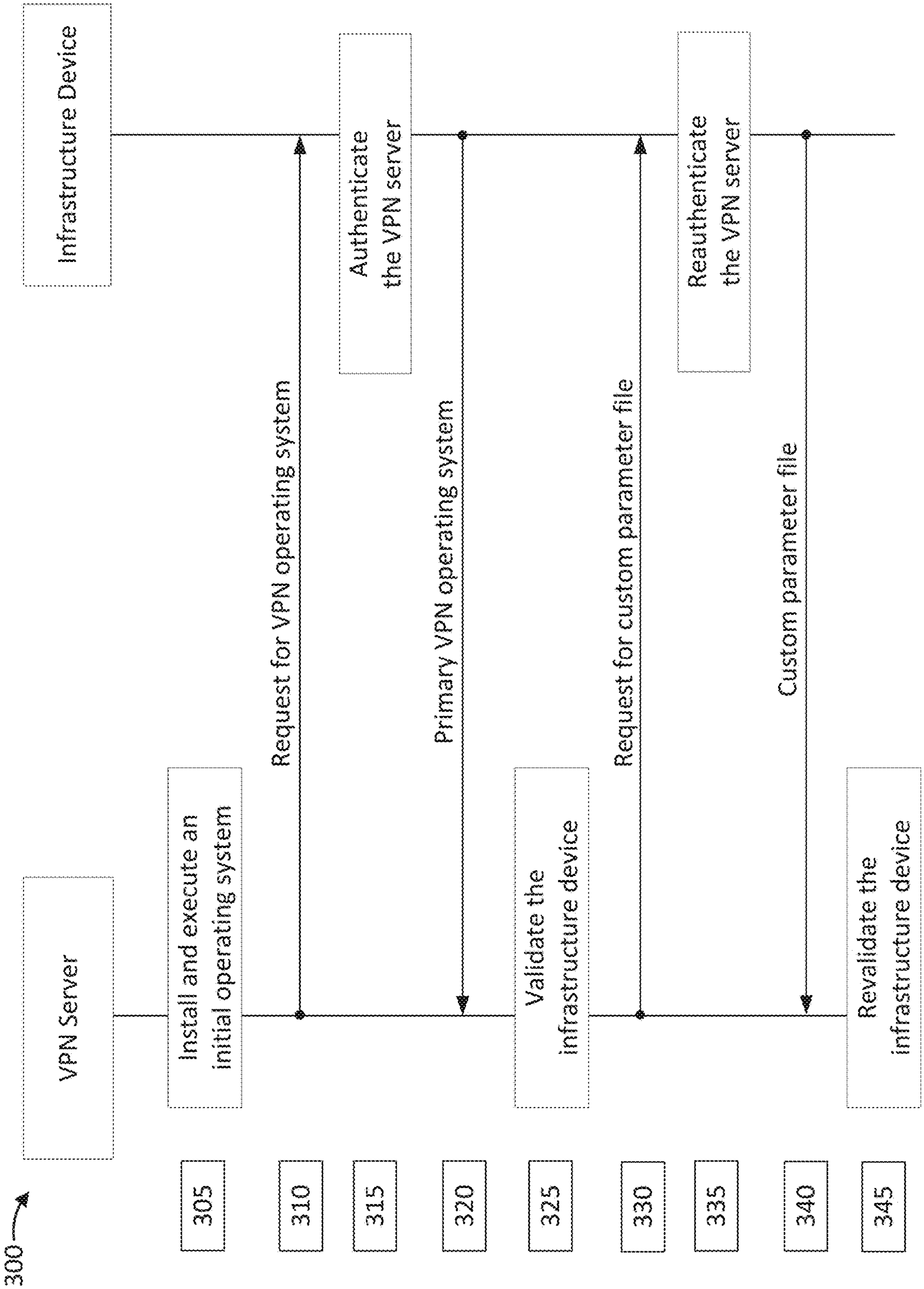

FIG. 3 is an illustration of an example flow associated with protected configuration of a VPN server, according to various aspects of the present disclosure.

Figure 4:
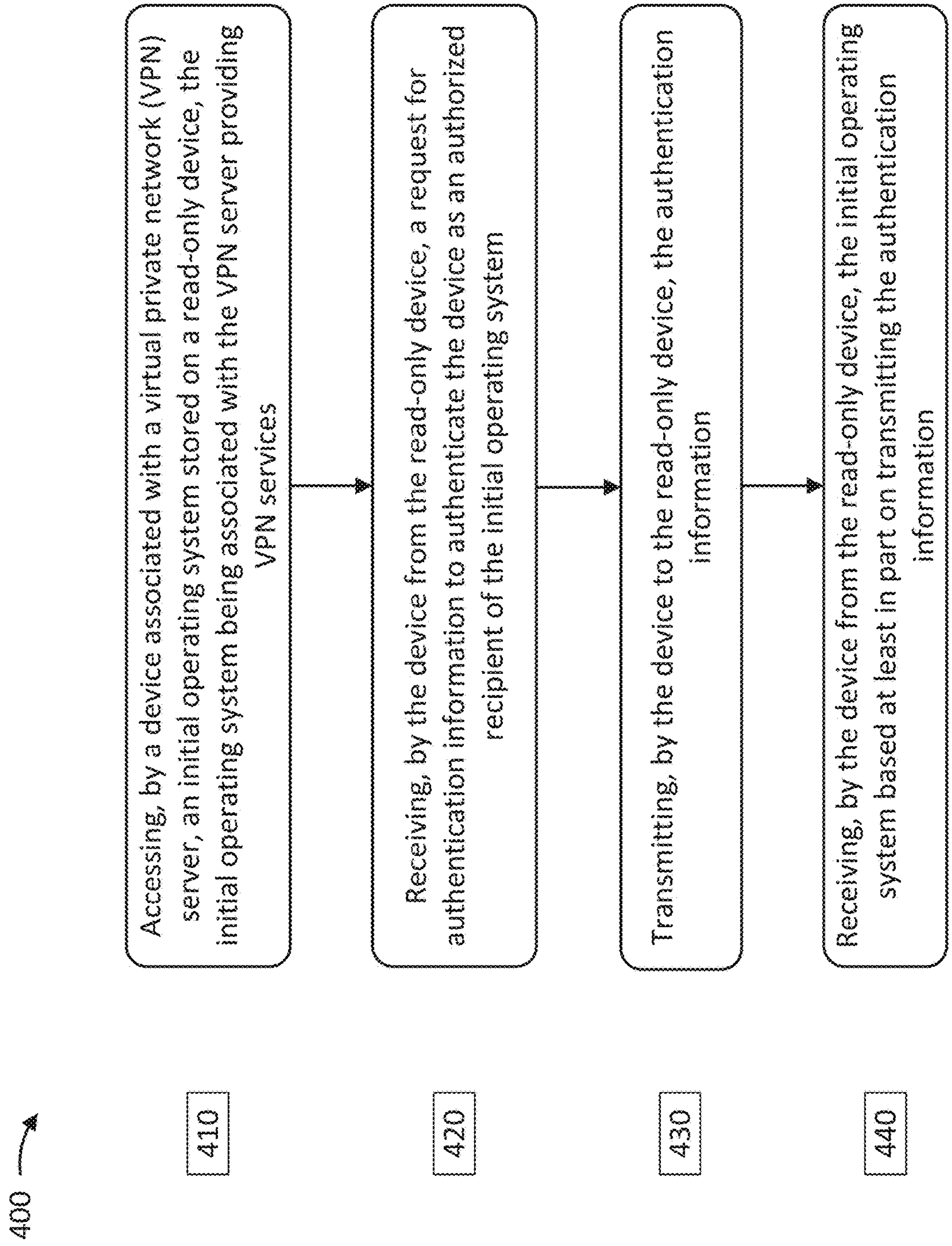

FIG. 4 is an illustration of an example process associated with protected configuration of a VPN server, according to various aspects of the present disclosure.

Figure 5:
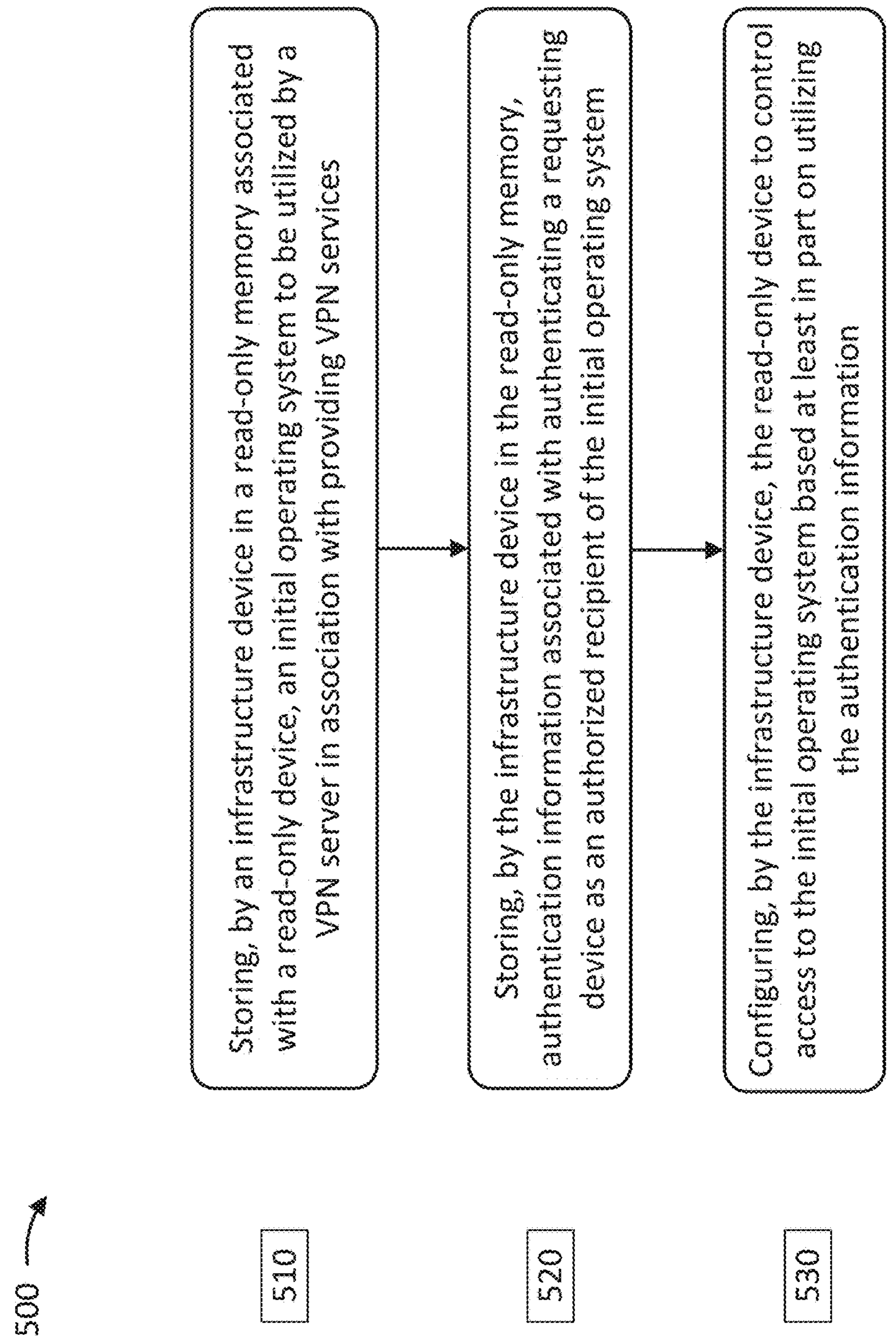

FIG. 5 is an illustration of an example process associated with protected configuration of a VPN server, according to various aspects of the present disclosure.

Figure 6:
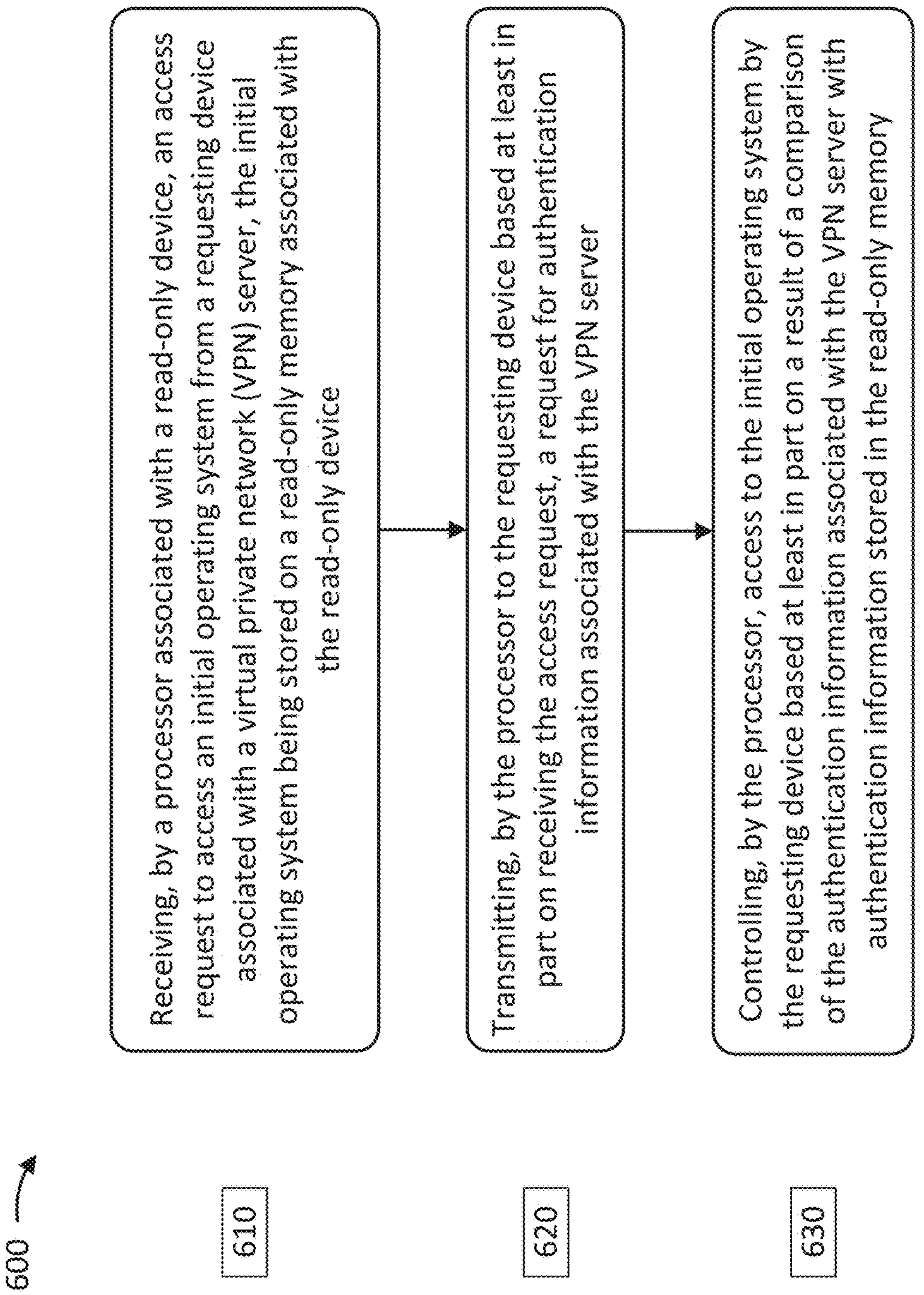

FIG. 6 is an illustration of an example process associated with protected configuration of a VPN server, according to various aspects of the present disclosure.

Figure 7:
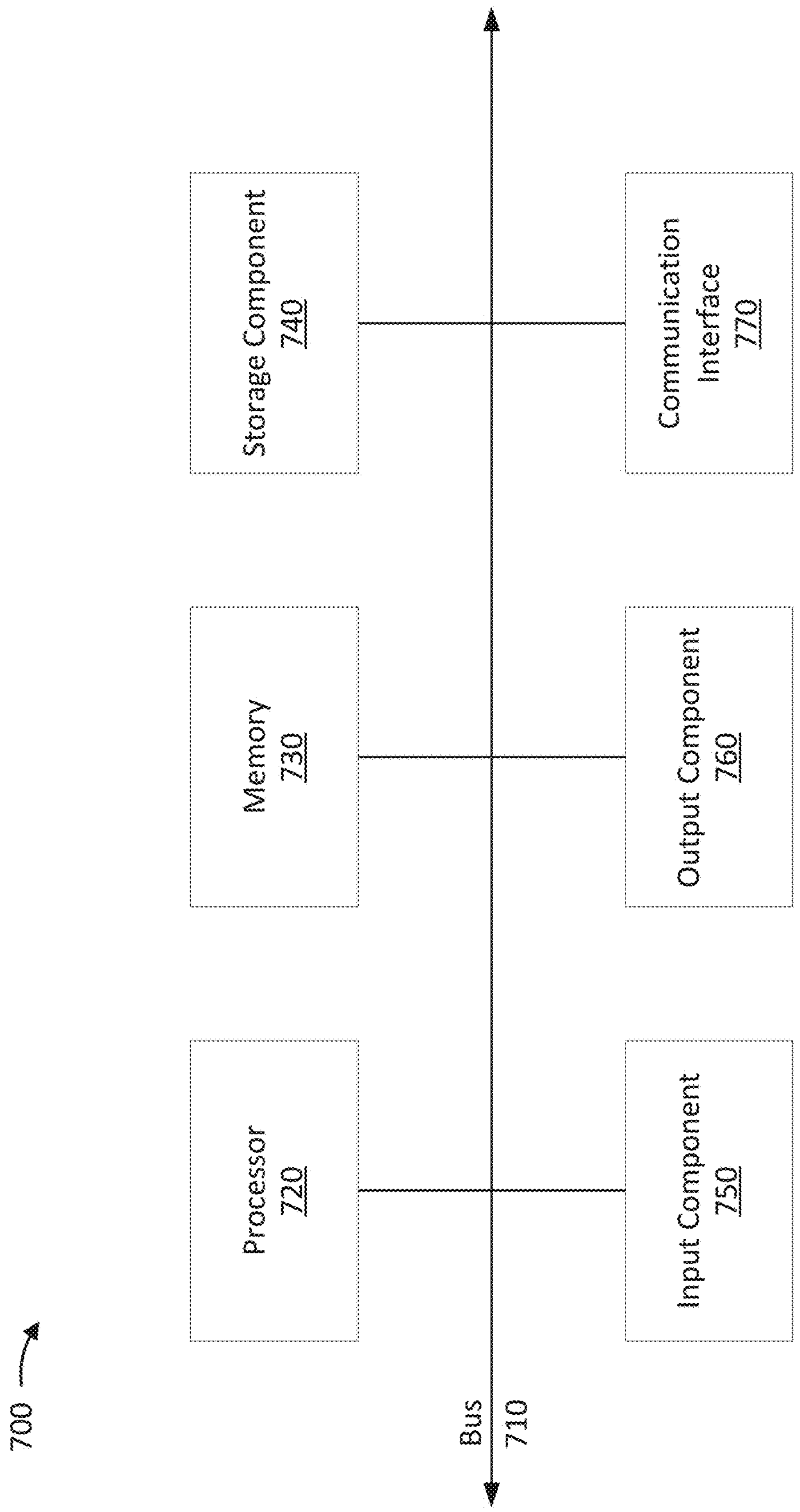

FIG. 7 is an illustration of example devices associated with protected configuration of a VPN server, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with protected configuration of a VPN server, according to various aspects of the present disclosure. Example 100 shows an architectural depiction of components included in system 100. In some aspects, the components may include a user device 102 capable of communicating with a VPN service provider (VSP) control infrastructure 104 and with one or more VPN servers 120 over a network 114. The VSP control infrastructure 104 may be controlled by a VPN service provider and may include an application programming interface (API) 106, a user database 108, processing unit 110, a server database 112, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 114. The processing unit 110 may be capable of configuring and controlling operation of the one or more VPN servers 120. As further shown in FIG. 1, VPN server N 120 may be configured to communicate with an authentication server 118 over a network 116. Other VPN servers, from among the one or more VPN servers 120, may also be configured to communicate with the authentication server 118 in a similar and/or analogous manner. The processing unit 110 may be capable of configuring and controlling operation of the authentication server 118. In some aspects, the network 116 may be similar to network 114.

The user device 102 may be a physical computing device capable of hosting a VPN application and of connecting to the network 114. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 114 may be any digital telecommunication network that permits several nodes to share and access resources. In some aspects, the network 114 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 114, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add, delete, and/or modify such valid unique combinations of user IDs and passwords from the structured repository. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may enable the user device 102 to obtain VPN services. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120.

In some aspects, the processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120. In some aspects, based at least in part on server penalty scores calculated utilizing the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

The user device 102 may transmit to the optimal VPN server an initiation request to establish a VPN connection (e.g., an encrypted tunnel) with the optimal VPN server. The optimal VPN server with which the user device establishes the encrypted tunnel may be referred to as a primary VPN server or an entry VPN server. Based at least in part on receiving the initiation request, the optimal VPN server may conduct a VPN authentication with the authentication server 118 to authenticate the user device 102 as a device that may receive the VPN services from the optimal VPN server. When the VPN authentication is successful, the optimal VPN server may proceed to provide the VPN services to the user device 120. Alternatively, when the VPN authentication fails, the optimal VPN server may refrain from providing the VPN services to the user device 120 and/or may communicate with the user device 120 to obtain additional information to authenticate the user device 102.

In some aspects, a VPN server 120 may include a piece of physical or virtual computer hardware and/or software capable of securely communicating with (the VPN application on) the user device 102 for provision of VPN services. Similarly, the authentication server 118 may include a piece of physical or virtual computer hardware and/or software capable of securely communicating with one or more VPN servers 120 for provision of authentication services.

One or more components (e.g., API 106, user database 108, processing unit 110, and/or server database 112) included in the VSP control infrastructure 104 and/or components (e.g., processing unit, memory, communication interface, etc.) included in the user device 102 and/or components (e.g., processing unit, memory, communication interface, etc.) may further be associated with a controller/processor, a memory, a communication interface, or a combination thereof (e.g., FIG. 7). For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A VPN service provider may associate a VSP control infrastructure with multiple VPN servers for providing VPN services. The VPN servers may be located in various locations around the globe to enable provision of the VPN services to variously located users. Some of the VPN servers may be owned and managed by the VPN service provider and some of the VPN servers may be owned and managed by another entity. In either case, the VSP control infrastructure may configure the VPN servers for providing the VPN services.

A VPN server may include a processor and a non-volatile memory to enable configuration of the VPN server. The VSP control infrastructure may store a VPN operating system in the non-volatile memory, which the processor may execute to enable the VPN server to operate and/or provide the VPN services. The VPN operating system may include sensitive information associated with operation of the VPN server such as, for example, information associated with determining cryptographic keys for encrypting communicated (e.g., transmitted and/or received) data, proprietary information (e.g., intellectual property) associated with operation of the VPN server, private information (e.g., user names) associated with user devices receiving the VPN services from the VPN server, or a combination thereof.

Such sensitive information may become compromised when, for example, a malicious party gains unauthorized access to the non-volatile memory. In an example, the malicious party may gain unauthorized access to the non-volatile memory by exploiting a network vulnerability associated with an ISP providing network services to the VPN server and/or by exploiting a network vulnerability associated with a local console utilized to manage the VPN server. In another example, the malicious party may gain unauthorized access to the non-volatile memory by physically removing the non-volatile memory. In yet another example, the malicious party may gain unauthorized access to the non-volatile memory by gaining unauthorized access to a device authorized to communicate with the VPN server and may communicate data including malware to the VPN server, the malware designed to enable the malicious party to gain unauthorized access to the VPN server (e.g., non-volatile memory). In yet another example, the malicious party may gain unauthorized access to the non-volatile memory by executing a man-in-the-middle attack by intercepting data communicated with the VPN server to introduce the malware within the data, the malware designed to enable the malicious party to gain unauthorized access to the VPN server (e.g., non-volatile memory).

Based at least in part on connecting with and/or gaining unauthorized access to the non-volatile memory, the malicious party may execute an unauthorized transmission of the sensitive information stored in the non-volatile memory. In another example, the malware may execute an unauthorized deletion of the sensitive information stored in the non-volatile memory. Further, the malicious party may utilize the malware to disrupt and/or damage operation of the VPN server. In an example, the malicious party may embed the malware within an operating system of a VPN server such that the operating system may run slower and/or associated circuitry may emit excessive heat and/or noise, thereby causing damage to the VPN server.

As a result, the VSP control infrastructure and/or the VPN server may expend various network resources (e.g., management resources, bandwidth resources, memory usage resources, processing resources, monetary resources, or the like) in efforts to mitigate effects of the malicious party gaining unauthorized access to the VPN server and/or to the non-volatile memory.

In some cases, even when the non-volatile memory may be encrypted, the malicious party may be able to use sophisticated computing equipment to gain unauthorized access to the non-volatile memory. Additionally, storing of the VPN operating system on respective non-volatile memories associated with the VPN servers may result in a configuration drift among the VPN servers. For instance, when the VPN operating system is installed on the respective non-volatile memories, future updates to the VPN operating system may result in inconsistent deletion and/or addition of data associated with the updates. As a result, the respective non-volatile memories may store inconsistent versions of the VPN operating system. Operating based on the inconsistent versions of the VPN operating system may result in the VPN servers operating in an unexpected manner and/or in a manner that is inconsistent with respect to each other. In this case, the VSP control infrastructure may expend network resources (e.g., management resources, bandwidth resources, memory usage resources, processing resources, monetary resources, or the like) to enable the multiple VPN servers to operate in an expected manner and/or in a manner that is consistent with the updates.

Various aspects of systems and techniques discussed in the present disclosure enable protected configuration of a VPN server. In some aspects, the VSP control infrastructure may enable the secure configuration based at least in part on obviating utilization of a non-volatile memory. In an example, the VSP control infrastructure may enable secure communication of a VPN operating system over the network to remotely configure the VPN server. Further, the VSP control infrastructure may enable the VPN server to utilize a volatile memory to execute the VPN operating system and operate to provide VPN services. The volatile memory may discard all data associated with the VPN operating system during a reboot or a restart. In this way, by obviating utilization of the non-volatile memory for storage of the VPN operating system, the VSP control infrastructure may mitigate effects of a malicious party gaining unauthorized access to the non-volatile memory, and, thereby, to the VPN operating system that includes the sensitive information. For instance, by obviating utilization of the non-volatile memory, the VSP control infrastructure and/or the VPN server may assist in avoiding (i) the sensitive information becoming compromised, (ii) disruption in operation of and/or damage to the VPN server, (iii) other hindrances caused by the malicious party gaining unauthorized access to the non-volatile memory, and/or (iv) effects of a configuration drift. Consequently, the VSP control infrastructure and/or the VPN server may enable efficient utilization of network resources (e.g., management resources, bandwidth resources, memory usage resources, processing resources, monetary resources, or the like) for suitable tasks associated with providing the VPN services.

In some aspects, a VPN server may access an initial operating system stored on a read-only device, the initial operating system being associated with the VPN server providing VPN services; receive, from the read-only device, a request for authentication information to authenticate the device as an authorized recipient of the initial operating system; transmit, to the read-only device, the authentication information; and receive, from the read-only device, the initial operating system based at least in part on transmitting the authentication information.

FIG. 2 is an illustration of an example 200 associated with protected configuration of a VPN server, according to various aspects of the present disclosure. FIG. 2 shows a VPN server 120 that is associated with a VSP control infrastructure 104 for providing VPN services. The VPN server 120 may include, for example, a processing unit 210, a volatile memory 220, and a network interface controller 230 communicatively coupled with a router 240. In some aspects, operation of the VPN server 120 may be managed by the VSP control infrastructure 104. In some aspects, operation of the VPN server 120 may be managed by another entity.

The VSP control infrastructure 104 may configure the VPN server 120 for providing the VPN services. In some aspects, the VSP control infrastructure 104 may configure the VPN server 120 remotely by providing configuration software over a network (e.g., network 114). As discussed in further detail with respect to FIG. 3, the VPN server 120 may utilize the network interface controller 230 to communicate with the router 240 to enable receipt of the configuration software (e.g., VPN operating system) from the VSP control infrastructure 104. Further, the VPN server 120 may install (e.g., load, store, and/or execute) the configuration software in the volatile memory 220. The processing unit 210 may utilize the configuration information installed on the volatile memory 220 to enable the VPN server 120 to provide the VPN services.

As indicated above, FIG. 2 is provided as an example. Other examples may differ from what is described with regard to FIG. 2.

FIG. 3 is an illustration of an example flow 300 associated with protected configuration of a VPN server, according to various aspects of the present disclosure. FIG. 3 shows a VPN server (e.g., VPN server 120) and an infrastructure device (e.g., processing unit 110 of VSP control infrastructure 104) in communication with each other. In some aspects, the VPN server and the infrastructure device may communicate over a network (e.g., network 114). In some aspects, the communication may be associated with configuring the VPN server to provide VPN services to user devices. In some aspects, the communication associated with configuring the VPN server may take place based at least in part on a starting up and/or rebooting of the VPN server.

As shown by reference numeral 305, the VPN server may retrieve and install (e.g., load, store, and/or execute) an initial operating system. In some aspects, based at least in part on starting up and/or rebooting, the VPN server may access instructions stored in association with a basic input/output system (e.g., BIOS). Such instructions, may enable the VPN server to retrieve the initial operating system from the network interface controller. In some aspects, the VSP control infrastructure 104 may pre-store the initial operating system in an electronic read-only memory associated with the network interface controller (e.g., read-only device). The VPN server (e.g., processing unit 210) may be unable to perform write operations associated with the electronic read-only memory. In an example, the VSP control infrastructure may store the initial operating system on the electronic read-only memory at a time of deployment of the VPN server and/or at a time of association of the VPN server with the VSP control infrastructure. The initial operating system may include, for example, iPXE software.

In some aspects, the VSP control infrastructure may pre-store the initial operating system on the electronic read-only memory in such a way that the network interface controller may control access and/or retrieval of the initial operating system. In an example, the VSP control infrastructure may write a custom version of the initial operating system to the electronic read-only memory. In another example, the VSP control infrastructure may utilize the custom version to overwrite an original version of the initial operating system programmed during manufacturing of the network interface controller. The VSP control infrastructure may pre-store, in the electronic read-only memory, authentication information including identification information that uniquely identifies hardware components associated with the VPN server. The identification information may include, for example, serial numbers that uniquely identify one or more of a processor (e.g., the processing unit 210, processor 720, etc.), the motherboard associated with the VPN server, etc.

Based at least in part on detecting an attempt to access and/or receiving an access request to retrieve the initial operating system from the electronic read-only memory, the network interface controller may utilize an associated controller (e.g., processor 720) and/or the identification information to control access to the initial operating system. In an example, when the VPN server attempts to access and/or retrieve the initial operating system, the associated controller may request and receive authentication/identification information (including identification information identifying one or more of the processor (e.g., the processing unit 210, processor 720), the motherboard associated with the VPN server, etc.) from the VPN server. The associated controller may compare the received identification information with the identification information stored in the initial operating system. When the received identification information matches the stored identification information, the associated controller may enable the VPN server to access and/or retrieve the initial operating system. When the received identification information fails to match the stored identification information, the associated controller may deny the VPN server from accessing and/or retrieving the initial operating system.

In some aspects, the electronic read-only memory may be associated with a total number of write operations. In other words, the VSP control infrastructure may program the electronic read-only memory the total number of times. Write operations may include adding information to the electronic read-only memory, editing information on the electronic read-only memory, deleting information from the electronic read-only memory, or a combination thereof. In some aspects, the VSP control infrastructure may preserve a threshold number of write operations to enable the VSP control infrastructure to, for example, delete the initial operating system from the electronic read-only memory when the VPN server is being decommissioned. In an example, the VSP control infrastructure may preserve the threshold number of write operations based at least in part on completing programming of the custom version of the initial operating system within a predetermined number of write operations, the predetermined number being equal to or less than a difference between the total number and the threshold number. Storing the initial operating system on the electronic read-only memory may be more secure than storing the initial operating system on a non-volatile memory because it may be easier for a malicious party to gain unauthorized access to the non-volatile memory as compare to the electronic read-only memory associated with the network interface controller.

The VPN server may retrieve the initial operating system from the electronic read-only memory. Further, the VPN server may install (e.g., load, store, and/or execute) the initial operating system on an associated volatile memory (e.g., volatile memory 220). The VPN server may utilize an associated processing unit (e.g., processing unit 210) to execute the initial operating system.

Based at least in part on executing the initial operating system from the volatile memory, the VPN server may receive configuration information included in and/or associated with the initial operating system. In some aspects, the configuration information may enable the VPN server to communicate with the infrastructure device (e.g., VSP control infrastructure 104) for obtaining a VPN operating system to enable the VPN server to provide the VPN services. In an example, among other information, the configuration information may include communication information (e.g., IP address associated with the infrastructure device) to be utilized for communicating with the infrastructure device, authentication information associated with enabling authentication of the VPN server by the infrastructure device, and/or certification information to enable the VPN server to validate the infrastructure device as a valid transmitter and/or provider of the VPN operating system.

Further, the router, which is responsible for operation of a local network associated with the VPN server, may provide network configuration information (e.g., IP address and/or media access control (MAC) address associated with the VPN server, a gateway address, a netmask, a domain name services (DNS) server address, or a combination thereof) to enable the VPN server to communicate with devices (e.g., a user device 102) over the network. In some aspects, the router and the VPN server may utilize a dynamic host configuration protocol (DHCP) and/or a bootstrap protocol (BOOTP) to communicate the operation information.

As shown by reference numeral 310, based at least in part on receiving the configuration information and/or based at least in part on executing the initial operating system, the VPN server may transmit to the infrastructure device a request for the VPN operating system. In some aspects, the VPN server may utilize the communication information to transmit the request to the infrastructure device. The request may be transmitted in association with authentication information. In an example, the request may include authentication information. In another example, the request may be accompanied by the authentication information. The authentication information may enable the infrastructure device to authenticate the VPN server as an authorized recipient of the VPN operating system. The authentication information may include identification information that uniquely identifies components (e.g., hardware and/or firmware) included in and/or associated with the VPN server. In an example, the identification information may include a serial number identifying the processing unit, a serial number identifying the network interface controller, a serial number identifying the network interface controller, a serial number identifying a universal serial bus (USB) device associated with the VPN sever, a serial number identifying a peripheral component interconnect (PCI) device associated with the VPN server, and/or a serial number identifying the volatile memory. In another example, the identification information may include a MAC address associated with the network interface controller. In yet another example, the identification information may include a serial number identifying a hard drive and/or a motherboard included in and/or associated with the VPN server and/or certificate information provided with the initial operating system (to indicate that the authorized initial operating system is providing the identification information).

As shown by reference numeral 315, based at least in part on receiving the request for the VPN operating system, the infrastructure device may authenticate the VPN server. In some aspects, the infrastructure device may compare received identification information in the request with stored identification information, which identifies the components included in and/or associated with the VPN server. In some aspects, the VSP control infrastructure may store the stored identification information in a database (e.g., server database 112) at a time of deployment of the VPN server and/or at a time of association of the VPN server with the VSP control infrastructure. Further, based at least in part on a result of the comparison, the infrastructure device may selectively transmit a portion of the VPN operating system to the VPN server. When the result of the comparison indicates that the received identification information matches the stored identification information, as shown by reference numeral 320, the infrastructure device may determine that the VPN server is an authorized recipient and may select to transmit a primary VPN operating system to the VPN server. Alternatively, when the result of the comparison indicates that the received identification information fails to match the stored identification information, the infrastructure device may determine that the VPN server is not an authorized recipient. In this case, the infrastructure device may select to decline the request and/or refrain from transmitting the primary VPN operating system to the VPN server. In some aspects, the primary VPN operating system may include a common operating system utilized to configure VPN servers associated with the infrastructure device.

As shown by reference numeral 325, while executing the initial operating system, the VPN server may validate the infrastructure device as an authorized transmitter and/or provider of the primary VPN operating system. In some aspects, the infrastructure device may transmit a certificate indicating certification information in association with the primary VPN operating system. The received certification information may include a signature of the infrastructure as the transmitter and/or provider of the primary VPN operating system. Based at least in part on receiving the certificate indicating the received certification information, the VPN server may compare the received certification information with stored certification information (e.g., certification information included in the configuration information). Further, based at least in part on a result of the comparison, the VPN server may selectively install (e.g., load, store, and/or execute) the primary VPN operating system. For instance, when the result of the comparison indicates that the received certification information matches the stored certification information the VPN server may determine that the infrastructure device is an authorized transmitter and/or provider of the primary VPN operating system. In this case, the VPN server may select to install (e.g., load, store, and/or execute) the primary operating system on the volatile memory. Further, the VPN server may begin executing the primary VPN operating system in place of the initial operating system. Additionally, as shown by reference numeral 330, while executing the primary VPN operating system, the VPN server may select to transmit a request for a custom parameter file associated with the VPN server providing the VPN services. Alternatively, when the result of the comparison indicates that the received certification information fails to match the stored certification information, the VPN server may determine that the infrastructure device is not an authorized transmitter and/or provider of the primary VPN operating system. In this case, the VPN server may select to discard the received primary VPN operating system and/or to retransmit the request for the VPN operating system.

In some aspects, the custom parameter file may include custom parameters specific to the VPN server and may be utilized by the VPN server in combination with the primary operating system to configure the VPN server to provide the VPN services. In some aspects the request for the custom parameter file may include the authentication information including the identification information.

As shown by reference numeral 335, the infrastructure device may reauthenticate the VPN server based at least in part on receiving the request for the custom parameter file. In some aspects, the infrastructure device may re-compare received identification information in the request for the custom parameter file with the stored identification information, which identifies the components included in and/or associated with the VPN server. Further, based at least in part on a result of the comparison, the infrastructure device may selectively transmit the custom parameter file to enable the VPN server to provide the VPN services. For instance, when the result of the comparison indicates that the received identification information matches the stored identification information, as shown by reference numeral 340, the infrastructure device may determine that the VPN server is an authorized recipient of the custom parameter file and may select to transmit the custom parameter file to the VPN server. Alternatively, when the result of the comparison indicates that the received identification information fails to match the stored identification information, the infrastructure device may determine that the VPN server is not an authorized recipient of the custom parameter file. In this case, the infrastructure device may select to decline the request and/or refrain from transmitting the custom parameter file to the VPN server.

In some aspects, instead of transmitting the custom parameter file based at least in part on receiving the request for the custom parameter file, the infrastructure device may start a timer based at least in part on transmitting the primary VPN operating system. The timer may be associated with a predetermined duration of time, which may be associated with (e.g., substantially equal to) an estimated amount of time utilized by the VPN server to validate the infrastructure device (e.g., block 325). Prior to or at an expiration of the predetermined duration of time, the infrastructure device may transmit the custom parameter file to the VPN server. In this case, the infrastructure device may avoid receiving the request for custom parameter file (e.g., block 330) and may avoid reauthenticating the VPN server (e.g., block 335).

As shown by reference numeral 345, while executing the primary VPN operating system, the VPN server may revalidate the infrastructure device as an authorized transmitter and/or provider of the custom parameter file. In some aspects, the infrastructure device may transmit the certificate indicating the certification information in association with the custom parameter file. The received certification information may include the signature of the infrastructure as the transmitter and/or provider of the custom parameter file. Based at least in part on receiving the custom parameter file and the certificate indicating the received certification information, the VPN server may re-compare the received certification information with stored certification information (e.g., certification information included in the configuration information). Further, based at least in part on a result of the comparison, the VPN server may selectively utilize the custom parameters included in custom parameter file. For instance, when the result of the comparison indicates that the received certification information matches the stored certification information, the VPN server may determine that the infrastructure device is an authorized transmitter and/or provider of the custom parameters and may select to configure the primary operating system with the custom parameters to provide the VPN services. In this case, the VPN server may be fully configured with the VPN operating system and may be ready to provide the VPN services. Alternatively, when the result of the comparison indicates that the received certification information fails to match the stored certification information, the VPN server may determine that the infrastructure device is not an authorized transmitter and/or provider of the custom parameter file. In this case, the VPN server may select to discard the received custom parameter file and/or to retransmit the request for the custom parameter file.

In some aspects, because the VPN operating system is installed on the volatile memory, the VPN server and/or the infrastructure device may repeat one or more processes associated with blocks 305-345 based at least in part on the VPN server restarting and/or rebooting. The restarting and/or rebooting of the VPN server may be due to, for example, a scheduled restart and/or reboot performed by the infrastructure device, network issues such as slow speeds, weak signal, etc., a power outage experienced by the VPN server, a malfunction of the operating system and/or a hardware component associated with the VPN server, or a combination thereof.

In some aspects, the infrastructure device may transmit, and the VPN server may receive, the primary VPN operating system and the custom parameter file separately to utilize resources more efficiently. The primary VPN operating system may include a threshold amount of data associated with configuring a processor to operate as a VPN server, and the infrastructure device may expend a threshold amount of resources to determine and/or transmit the primary VPN operating system. On the other hand, the custom parameter file may include a nominal amount of data associated with customizing a given primary VPN operating system to provide VPN services. Resources are more efficiently utilized by determining/transmitting a single primary VPN operating system and then determining/transmitting respective customer parameter files rather than determining custom configuration files including the respective custom parameter file.

In this way, the VPN server and/or the infrastructure device may obviate utilization of a non-volatile memory for installation (e.g., loading, storing, and/or execution) of the VPN operating system. As a result, the VPN server and/or the infrastructure device may mitigate effects of a malicious party gaining unauthorized access to the non-volatile memory, and, thereby, to the VPN operating system that includes the sensitive information. For instance, by obviating utilization of the non-volatile memory, the VPN server and/or the infrastructure device may assist in avoiding (i) sensitive information becoming compromised, (ii) disruption in operation of and/or damage to the VPN server, (iii) other hindrances caused by the malicious party gaining unauthorized access to the non-volatile memory, and/or (iv) effects of a configuration drift. Consequently, the VPN server and/or the infrastructure device may enable efficient utilization of network resources (e.g., management resources, bandwidth resources, memory usage resources, processing resources, monetary resources, or the like) for suitable tasks associated with providing the VPN services.

As indicated above, FIG. 3 is provided as an example. Other examples may differ from what is described with regard to FIG. 3.

FIG. 4 is an illustration of an example process 400 associated with protected configuration of a VPN server, according to various aspects of the present disclosure. In some aspects, the process 400 may be performed by a processor/controller (e.g., processing unit 210, processor 720) associated with a VPN server (e.g., VPN server 120). As shown by reference numeral 410, process 400 includes accessing, by a device associated with a virtual private network (VPN) server, an initial operating system stored on a read-only device, the initial operating system being associated with the VPN server providing VPN services. For instance, the VPN server may utilize the associated processor/controller to access an initial operating system stored on a read-only device, the initial operating system being associated with the VPN server providing VPN services, as discussed elsewhere herein.

As shown by reference numeral 420, process 400 includes receiving, by the device from the read-only device, a request for authentication information to authenticate the device as an authorized recipient of the initial operating system. For instance, the VPN server may utilize a communication interface (e.g., communication interface 770) and the associated processor/controller to receive, from the read-only device, a request for authentication information to authenticate the device as an authorized recipient of the initial operating system, as discussed elsewhere herein.

As shown by reference numeral 430, process 400 includes transmitting, by the device to the read-only device, the authentication information. For instance, the VPN server may utilize the associated communication interface and/or processor/controller to transmit, to the read-only device, the authentication information, as discussed elsewhere herein.

As shown by reference numeral 440, process 400 includes receive, from the read-only device, the initial operating system based at least in part on transmitting the authentication information. For instance, the VPN server may utilize the associated communication interface and the associated processor/controller to receive, from the read-only device, the initial operating system based at least in part on transmitting the authentication information, as discussed elsewhere herein.

Process 400 may include additional aspects, such as any single aspect or any combination of aspects described below and/or in connection with one or more other processes described elsewhere herein.

In a first aspect, in process 400, the authentication information includes identification information that uniquely identifies components associated with the VPN server.

In a second aspect, alone or in combination with the first aspect, in process 400, the initial operating system is stored on a read-only memory included in the read-only device.

In a third aspect, alone or in combination with the first through second aspects, process 400 may include installing the initial operating system on a volatile memory to enable the VPN server to provide the VPN services.

In a fourth aspect, alone or in combination with the first through third aspects, process 400 may include executing the initial operating system from a volatile memory to enable the VPN server to obtain a VPN operating system associated with providing the VPN services.

In a fifth aspect, alone or in combination with the first through fourth aspects, process 400 may include transmitting, to an infrastructure device, a request for a VPN operating system based at least in part on executing the initial operating system from a volatile memory.

In a sixth aspect, alone or in combination with the first through fifth aspects, in process 400, the read-only device includes a network interface controller.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with protected configuration of a VPN server, according to various aspects of the present disclosure. In some aspects, the process 500 may be performed by an infrastructure device (e.g., processing unit 110, processor 720) associated with a VSP control infrastructure (e.g., VSP control infrastructure 104). As shown by reference numeral 510, process 500 includes storing, by an infrastructure device in a read-only memory associated with a read-only device, an initial operating system to be utilized by a VPN server in association with providing VPN services. For instance, the infrastructure device may utilize the associated processor/controller to store, in a read-only memory associated with a read-only device, an initial operating system to be utilized by a VPN server in association with providing VPN services, as discussed elsewhere herein.

As shown by reference numeral 520, process 500 includes storing, by the infrastructure device in the read-only memory, authentication information associated with authenticating a requesting device as an authorized recipient of the initial operating system. For instance, the infrastructure device may utilize an associated memory/processor to store, in the read-only memory, authentication information associated with authenticating a requesting device as an authorized recipient of the initial operating system, as discussed elsewhere herein.

As shown by reference numeral 530, process 500 includes configuring, by the infrastructure device, the read-only device to control access to the initial operating system based at least in part on utilizing the authentication information. For instance, the infrastructure device may utilize the associated processor/controller to configure the read-only device to control access to the initial operating system based at least in part on utilizing the authentication information, as discussed elsewhere herein.

Process 500 may include additional aspects, such as any single aspect or any combination of aspects described below and/or in connection with one or more other processes described elsewhere herein.

In a first aspect, in process 500, configuring the read-only device includes configuring the read-only device to compare authentication information received from the requesting device with the authentication information stored in the read-only memory.

In a second aspect, alone or in combination with the first aspect, in process 500, configuring the read-only device includes configuring the read-only device to provide access to the initial operating system when authentication information received from the requesting device matches the authentication information stored in the read-only memory.

In a third aspect, alone or in combination with the first through second aspects, in process 500, configuring the read-only device includes configuring the read-only device to deny access to the initial operating system when authentication information received from the requesting device fails to match the authentication information stored in the read-only memory.

In a fourth aspect, alone or in combination with the first through third aspects, in process 500, storing the initial operating system includes overwriting a previous version of the initial operating system.

In a fifth aspect, alone or in combination with the first through fourth aspects, in process 500, storing the initial operating system includes completing storing of the initial operating system within a predetermined number of write operations, the predetermined number being equal to or less than a difference between a total number of write operations and threshold number of write operations associated with deleting the initial operating system.

In a sixth aspect, alone or in combination with the first through fifth aspects, in process 500, the authentication information includes identification information that uniquely identifies hardware components associated with the VPN server.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with protected configuration of a VPN server, according to various aspects of the present disclosure. In some aspects, the process 600 may be performed by a processor/controller (e.g., processor 720) associated with a read-only device (e.g., network interface controller 230). As shown by reference numeral 610, process 600 includes receiving, by a processor associated with a read-only device, an access request to access an initial operating system from a requesting device associated with a virtual private network (VPN) server, the initial operating system being stored on a read-only memory associated with the read-only device. For instance, the read-only device may utilize a communication interface (e.g., communication interface 770) with the associated processor/controller to receive an access request to access an initial operating system from a requesting device associated with a virtual private network (VPN) server, the initial operating system being stored on a read-only memory associated with the read-only device, as discussed elsewhere herein.

As shown by reference numeral 620, process 600 includes transmitting, by the processor to the requesting device based at least in part on receiving the access request, a request for authentication information associated with the VPN server. For instance, the read-only device may utilize the associated communication interface and/or processor/controller to transmit, to the requesting device based at least in part on receiving the access request, a request for authentication information associated with the VPN server, as discussed elsewhere herein.

As shown by reference numeral 630, process 600 includes controlling, by the processor, access to the initial operating system by the requesting device based at least in part on a result of a comparison of the authentication information associated with the VPN server with authentication information stored in the read-only memory. For instance, the read-only device may utilize the associated processor/controller to control access to the initial operating system by the requesting device based at least in part on a result of a comparison of the authentication information associated with the VPN server with authentication information stored in the read-only memory, as discussed elsewhere herein.

Process 600 may include additional aspects, such as any single aspect or any combination of aspects described below and/or in connection with one or more other processes described elsewhere herein.

In a first aspect, in process 600, controlling access to the initial operating system includes allowing access to the initial operating system by the requesting device when the result indicates that the authentication information associated with the VPN server matches the authentication information stored in the read-only memory.

In a second aspect, alone or in combination with the first aspect, in process 600, controlling access to the initial operating system includes denying access to the initial operating system by the requesting device when the result indicates that the authentication information associated with the VPN server fails to match the authentication information stored in the read-only memory.

In a third aspect, alone or in combination with the first through second aspects, in process 600, the authentication information includes identification information that uniquely identifies hardware components associated with the VPN server.

In a fourth aspect, alone or in combination with the first through third aspects, process 600 may include transmitting network configuration information to the requesting device to enable the requesting device to obtain a VPN operating system when the result indicates that the authentication information associated with the VPN server matches the authentication information stored in the read-only memory.

In a fifth aspect, alone or in combination with the first through fourth aspects, process 600 may include receiving the authentication information from the requesting device based at least in part on transmitting the request for the authentication information, the authentication information including identification information to uniquely identify hardware components associated with the VPN server.

In a sixth aspect, alone or in combination with the first through fifth aspects, in process 600, the read-only device includes a network interface controller.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, environments, infrastructures, components, or the like described elsewhere herein (e.g., FIG. 1 and/or FIG. 2) and may be used to perform the processes described with respect to FIGS. 3 and 4. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

transmitting, by virtual private network (VPN) server to an infrastructure device while the VPN server is executing a primary VPN operating system, a request for a custom parameter file to enable the VPN server to provide VPN services;

authenticating, by the infrastructure device, the VPN server as an authorized recipient of the custom parameter file;

transmitting, by the infrastructure device to the VPN server, the custom parameter file based at least in part on authenticating the VPN server as the authorized recipient of the custom parameter file; and configuring, by the VPN server, the primary VPN operating system to utilize the custom parameter file to enable the VPN server to provide the VPN services.

2. The method of claim 1, wherein the custom parameter file includes custom parameters that are specific to the VPN server with respect to providing the VPN services.

3. The method of claim 1, wherein the custom parameter file includes custom parameters to be utilized in combination with the primary operating system to enable the VPN server to provide the VPN services.

4. The method of claim 1, wherein transmitting the request includes the VPN server transmitting authentication information to enable the infrastructure device to authenticate the VPN server as an authorized recipient of the custom parameter file.

5. The method of claim 1, wherein authenticating the VPN server includes the infrastructure device comparing received authentication information that is received from the VPN server with stored authentication information that is associated with the VPN server.

6. The method of claim 1, further comprising:

validating, by the VPN server, the infrastructure device as an authorized provider of the custom parameter file.

7. The method of claim 1, further comprising:

executing, by the VPN server, the primary VPN operating system by utilizing a volatile memory.

8. A system, comprising:

a virtual private network (VPN) server; and an infrastructure device, wherein the VPN server is configured to transmit, to the infrastructure device while the VPN server is executing a primary VPN operating system, a request for a custom parameter file to enable the VPN server to provide VPN services;

the infrastructure device is configured to authenticate the VPN server as an authorized recipient of the custom parameter file;

the infrastructure device is configured to transmit, to the VPN server, the custom parameter file based at least in part on authenticating the VPN server as the authorized recipient of the custom parameter file; and the VPN server is configured to configure the primary VPN operating system to utilize the custom parameter file to enable the VPN server to provide the VPN services.

9. The system of claim 8, wherein the custom parameter file includes custom parameters that are specific to the VPN server with respect to providing the VPN services.

10. The system of claim 8, wherein the custom parameter file includes custom parameters to be utilized in combination with the primary operating system to enable the VPN server to provide the VPN services.

11. The system of claim 8, wherein, to transmit the request, the VPN server is configured to transmit authentication information to enable the infrastructure device to authenticate the VPN server as an authorized recipient of the custom parameter file.

12. The system of claim 8, wherein, to authenticate the VPN server, the infrastructure device is configured to compare the received authentication information that is received from the VPN server with stored authentication information that is associated with the VPN server.

13. The system of claim 8, wherein the VPN server is configured to validate the infrastructure device as an authorized provider of the custom parameter file.

14. The system of claim 8, wherein the VPN server is configured to execute the primary VPN operating system by utilizing a volatile memory.

15. A non-transitory computer-readable medium configured to store instructions, which instructions when executed by a virtual private network (VPN) server or by an infrastructure device, configure:

the VPN server to transmit, to the infrastructure device while the VPN server is executing a primary VPN operating system, a request for a custom parameter file to enable the VPN server to provide VPN services;

the infrastructure device to authenticate the VPN server as an authorized recipient of the custom parameter file;

the infrastructure device to transmit, to the VPN server, the custom parameter file based at least in part on authenticating the VPN server as the authorized recipient of the custom parameter file; and the VPN server to configure the primary VPN operating system to utilize the custom parameter file to enable the VPN server to provide the VPN services.

16. The non-transitory computer-readable medium of claim 15, wherein the custom parameter file includes custom parameters that are specific to the VPN server with respect to providing the VPN services.

17. The non-transitory computer-readable medium of claim 15, wherein the custom parameter file includes custom parameters to be utilized in combination with the primary operating system to enable the VPN server to provide the VPN services.

18. The non-transitory computer-readable medium of claim 15, wherein, to transmit the request, the VPN server is configured to transmit authentication information to enable the infrastructure device to authenticate the VPN server as an authorized recipient of the custom parameter file.

19. The non-transitory computer-readable medium of claim 15, wherein, to authenticate the VPN server, the infrastructure device is configured to compare the received authentication information that is received from the VPN server with stored authentication information that is associated with the VPN server.

20. The non-transitory computer-readable medium of claim 15, wherein the VPN server is configured to validate the infrastructure device as an authorized provider of the custom parameter file.

* * * * *